March 10, 1964 L. L. RYDER 3,124,662

MAGNETIC RECORDING AND REPRODUCING SYSTEM

Filed April 5, 1960 2 Sheets-Sheet 1

INVENTOR.
LOREN L. RYDER
BY Lilly & Nyhagen
Attorneys

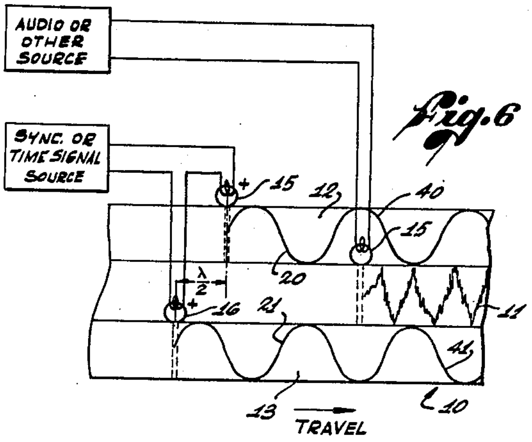
FIG. 6
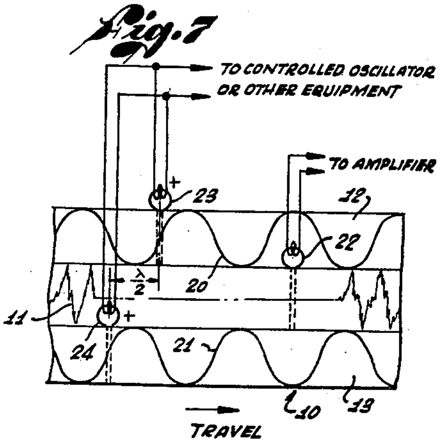
FIG. 7
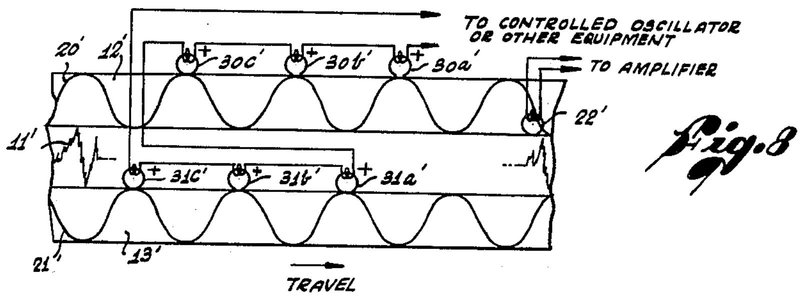
FIG. 8
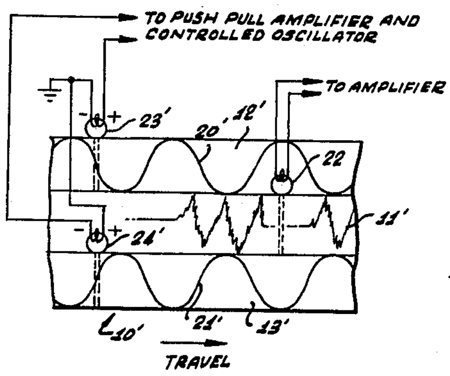
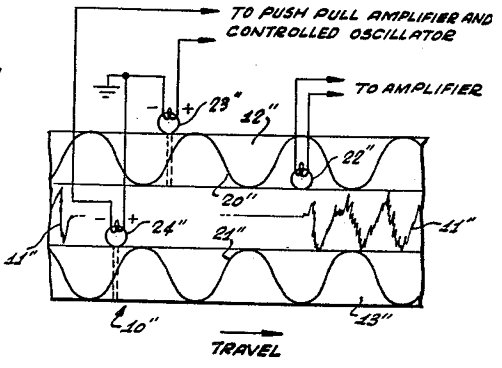
FIG. 9 FIG. 10
INVENTOR.
LOREN L. RYDER
BY Lilly & Nyhagen
Attorneys United States Patent Office 3,124,662
Patented Mar. 10, 1964

3,124,662
MAGNETIC RECORDING AND REPRODUCING SYSTEM

Loren L. Ryder, 3506 Berry Drive, North Hollywood, Calif.
Filed Apr. 5, 1960, Ser. No. 20,095
2 Claims. (Cl. 179—100.2)

This invention relates to the art of magnetic recording and reproduction of electrical signals. One present illustrative application of the invention is in the field of magnetic recording of sound on a narrow magnetizable tape simultaneously with exposure of film in a motion picture camera, with synchronization of sound reproduction and picture projection subsequently realized through use of a synchronizing signal magnetically recorded on the tape along with the sound record at the time of initial recording.

The invention, however, is broad in application, and contemplates magnetic recording on tape of any width, and on magnetic disk and drum media as well. It contemplates also uses in many fields, such as, but without limitation to, synchronization of two or more recording tapes, two or more television picture tapes, synchronization of recording tapes to television tapes, the timing and/or synchronization of telemetering information, computer data, memory data, or transfer information recorded on tapes or other magnetic recording media, etc.

Referring more particularly to the first instanced sound record and picture film synchronization application, it has been common in the past to record on magnetizable tape both an audio record and a record of a synchronizing signal. Any frequency may be used for synchronization, however, a good choice is the frequency of the local commercial power supply which is most commonly 60 cycles per second. This and/or any desired frequency can be conveniently obtained, either from a signal generator powered by the camera movement, or from the power source when the camera is driven synchronously from an A.C. supply. The synchronizing signal has in the past been recorded in overlapping relation with the audio signal, and separated out in reproduction by suitable filters. In other cases, the synchronizing signal has been recorded in a narrow track along side the audio track. The synchronizing signal has been recorded on two tracks in opposite phase, i.e., with reverse polarity, either over or alongside the audio track, and special techniques utilized whereby the synchronizing signals cancel out in the audio reproducer head, while the audio signal cancels out in the synchronizing signal reproducer heads. A system of this general type wherein the two opposite polarity signals are recorded over the audio track was disclosed in U.S. Patent No. 2,697,754 to Ranger, and one wherein the two opposite polarity signals are recorded on edge tracks on opposite sides of an audio track was disclosed in U.S. Patent No. 2,709,204 to Holmes. In the latter instance, the problem to which the invention was addressed was that of possible mutual "cross talk" between the adjacent synchronizing signal tracks and the audio track.

The reproduced synchronizing signal in these prior systems is conventionally fed to a controllable oscillator and/or amplifier, which serves as a power source for synchronous motors driving the tape reproducer and picture projector, so as to attain synchronism between sound reproduction and picture projection.

One object of the present invention is to provide improvements in magnetic recorder-reproducer systems of these prior types.

The present invention is not concerned with and does not employ the above-mentioned techniques for separating out audio and synchronizing signals recorded over or adjacent to one another, no such provisions being found necessary. Systems of the general character mentioned, however, as well as other types of magnetic recording and reproducing systems for telemetering and other purposes, do present some previously unsolved problems, and it is the present purpose to overcome these problems. Among these are defects in the control signal records, such as "dropouts" (void regions in the magnetic material), faded signals or signal breaks, spurious harmonics or other signal "pips," and splices in the tape at which a portion of a wave length of the synchronizing signal record is lost. Such conditions as these can result in delivery to the oscillator and/or amplifier of a signal break, or signal wave discontinuity, irregularity, or frequency deviation of such magnitude as to cause the oscillator and/or amplifier to move temporarily out of its properly controlled condition, with ensuing erratic behaviour until stability can be regained. In the case of telemetering, such conditions can mean failure of a timing signal, loss of an information signal, or failure of intended equipment response generally.

An object of the invention is, accordingly, provision of a magnetic recording and reproducing system guarded to an unprecedented degree against signal failure and failure of equipment response.

A further object of the invention is to provide magnetic recording and reproducing systems of the general class described with means whereby there is greatly increased assurance of reproduction from the magnetic record media of a synchronizing, timing or other control signal which is a sufficiently accurate replica of the original signal, or signal record, to assure complete control and stability of the equipment utilizing such signal or signal record.

The invention may be briefly described in one illustrative application to synchronism of magnetic audio tape with a picture film as follows: A synchronizing signal generator is placed on the motion picture camera. The camera is assumed to be driven by a synchronous motor using commercial power at 60 c.p.s., and the signal generator is driven from the camera so as to deliver a 60 cycle synchronizing signal. The tape is assumed to be one-quarter inch in width, and an audio recording head has a recording slit, of a length of 180 mils, positioned transversely of the tape and located symmetrically of the longitudinal center line thereof, so as to record a centrally located audio track. The 60 cycle synchronizing signal is fed to at least two recording heads whose slits, of approximately 30 mils in length each, are positioned transversely of the tape, just outside the audio track, and in echelon, i.e., spaced apart longitudinally of the tape. These slits are preferably, for a reason to appear hereinafter, spaced apart longitudinally of the tape by any multiple of a half wave length of the recorded synchronizing signal on the tape. A spacing of one full wave length, or multiple thereof, has certain particular advantages, as will appear. The recording heads are energized in phase by the synchronizing signal. Correspondingly, in playback, or in reproduction, the slits of the reproducing heads are positioned in echelon, i.e., spaced apart longitudinally of the tape, and spacing is the same as that of the recording heads, or alternately, is the same plus any number of wave lengths. The output signals from the recording heads are combined in phase, and the resulting combined synchronizing signal fed to the power oscillator and/or amplifier in conventional fashion.

Now, let it be assumed that the tape has been spliced; and that the splice has resulted in removal of a length of tape which is not an exact multiple of a wave length. As the splice passes the first reproducer head slit, the discontinuity in signal wave pattern on the tape caused by the splice, amounting, in effect, to an instantaneous phase shift, produces a corresponding discontinuity or phase shift in the reproduced signal. However, because of the echelon arrangement of reproducer slits, the splice does not cause a corresponding discontinuity or phase shift in the reproduced signal from the second reproducer head slit simultaneously with the first. Thus, at any given instant, a continuous unbroken signal is delivered from at least one of the reproducer heads. The combined output from the two reproducer heads, accordingly, includes at every instant at least one continuous or unbroken signal component. Each signal component individually suffers a discontinuity or phase shift, but these occur in time sequence. The combined signal, then, because of an averaging effect, maintains a sufficiently good wave pattern and frequency stability for the transition through the splice to assure maintenance of continuous control over the power oscillator.

As a further feature of the invention, for still greater assurance of control where such may be desirable, and to attain other benefits, as will appear, plural reproducing heads, e.g., four, are used over each synchronizing signal track, spaced in tandem any multiple of a full wave length apart. The output signal components from all reproducer heads are combined, normally in phase, into one output synchronizing signal. The averaging effect of the plural reproducer heads scanning each track results in still less deviation in the final combined output signal caused by an out-of-phase splice, and such deviation becomes less appreciable in proportion to the number of heads used in tandem over the synchronizing signal tracks. The final output signal can thus be made to conform to the initially recorded wave form to greater and greater degree by using additional heads in tandem.

Reference is now directed to the accompanying drawings showing various illustrative recorder and reproducer systems in accordance with the invention, and wherein:

FIGS. 1 and 2, taken together, show a recorder and reproducer system in accordance with the invention;

Figure 5:
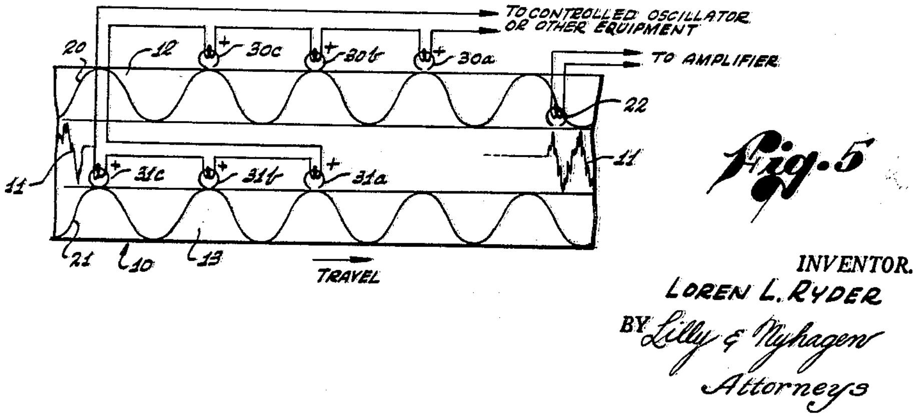
FIG. 5 shows a modified reproducer system in accordance with the invention cooperable in a combined system with the recorder of FIG. 1.

FIGS. 6 and 7, taken together, show another modified recorder and reproducer system in accordance with the invention;

FIG. 8 shows another modified reproducer system in accordance with the invention cooperable in a combined system with the recorder of FIG. 5;

FIG. 9 shows a modification of the reproducer system of FIG. 6; and

FIG. 10 shows a modification of the recorder system of FIG. 6.

Figure 1:
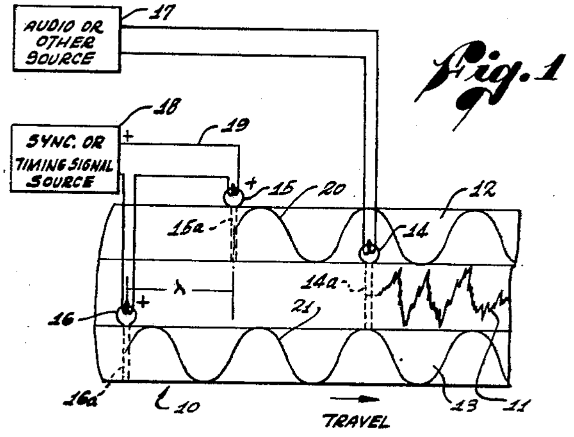
Figure 2:
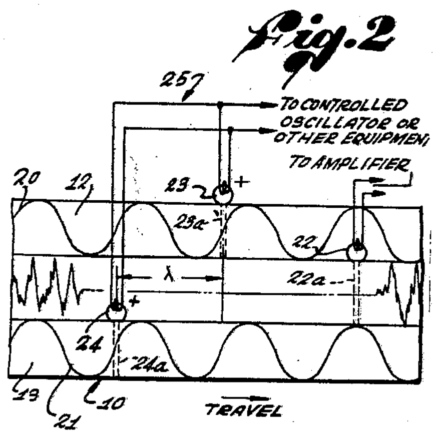

FIGS. 1 and 2 show schematically an illustrative magnetic tape recorder and reproducer in accordance with the invention, in an above-mentioned application to a system for taking a motion picture and making a sound record on magnetic tape, and subsequently projecting the picture and reproducing the sound record in synchronism therewith.

In FIGS. 1 and 2, the numeral 10 designates generally a magnetic tape, means for advancing the tape being assumed, but omitted from the drawings in view of their conventional character. The tape is illustratively ¼ inch in width. It has a central audio track 11, which may be 180 mils in width, adjacent to which are two synchronizing or control signal tracks 12 and 13, of about 30 mils in width. An audio signal recorder head, which may be of the ring type, or any other found suitable, is conventionally indicated at 14, and has a recording slit 14*a* extending transversely across audio track 11. Located either ahead of or following the audio head, preferably the later, as shown, are a pair of synchronizing signal recorder heads, also typically of the ring type, or of any other suitable type, conventionally indicated at 15 and 16, with recorder slits 15*a* and 16*a*, extending transversely across tracks 12 and 13, respectively. The heads 15 and 16 are disposed in echelon, with their recording slits spaced longitudinally of the tape by a predetermined distance, preferably, and as here shown, by a wave length distance $\lambda$ along the tape for the frequency of the synchronizing signal at the speed of tape travel as driven by the recorder. Thus, for a 60 cycle signal, and a tape speed of 7½ inches per second, the echelon displacement will be .125 inch. The recorder heads can equally well be spaced any multiple of full wave lengths along the tape, and for some purposes, multiple wave length displacement is preferred, as will subsequently appear.

The audio recorder head 14 is fed with an audio signal voltage, along with suitable bias, from audio source 17, which will be understood to imply, in this example, a microphone, amplifier and conventional biasing means as well understood in the art.

The recorder heads 15 and 16 may be connected in series or parallel, though preferably in series, as here shown, and are fed in phase with a synchronizing signal from a source conventionally indicated at 18 through series circuit 19. Reference positive polarity symbols are placed on the circuit diagram to denote that the windings of the recorder heads are energized in phase. It is to be understood that the recorder may be driven synchronously with a motion picture camera through synchronous motors powered by commercial power mains at a predetermined commercial frequency, ordinarily 60 cycles. A 60 cycle signal generator can, in accordance with well-known practice, be mounted on the camera and driven thereby so as to generate the synchronizing signal, and such a signal generator together with a suitable amplifier and bias means for magnetic recording purposes may constitute the synchronous signal source 18 of FIG. 1. The choice of commercial power frequency for the synchronizing signal is made for reasons well understood in the art.

The sine waves 20 and 21 depicted in FIGS. 1 and 2 symbolize the synchronizing signal components separably recorded on the tape, in phase, but at one wave length spacing therealong. It should incidentally be mentioned that the synchronizing signals, however, are not necessarily sinusoidal, but may be sawtooth, square wave, periodic pulse, or any other found useful.

In FIG. 2, an audio track reproducer head 22, with its scanning slit 22*a*, is disposed over the audio track 11 on the tape 10, which may be the tape 10 of FIG. 1, or a print thereof, and spaced therefrom, and from each other, exactly as synchronizing signal recorder heads 15 and 16 are spaced from audio recorder head 14, and from each other, are synchronizing signal reproducer heads 23 and 24, with their scanning slits 23*a* and 24*a* across tracks 12 and 13, respectively. Thus, heads 23 and 24 are in echelon, at one wave length spacing. These heads may also all be of the ring type, or any other found suitable.

The audio signal reproduced by audio head 22 is fed to a suitable audio amplifier, and thence to audible reproducing means. The synchronizing signal components reproduced by synchronizing signal reproducer heads 23 and 24 are combined, in phase, in either a series or parallel circuit, in this case a parallel circuit 25, and thence fed to the conventional controlled oscillator and/or amplifier, not shown, utilized to furnish power at the controlled frequency of the synchronizing signal to the synchronous motor driving the picture projector and/or the magnetic tape reproducer. The in-phase connection of the heads 23 and 24 is indicated by the positive polarity reference markings adjacent the heads in the circuit diagram.

Thus, synchronism of the audio record on the tape with picture projection is maintained. Since this synchronizing feature and its advantage is old per se, and well known in the art, no further description thereof will be necessary herein.

The echelon head spacing system of FIGS. 1 and 2 affords unique assurance of good transition across a discontinuity in the synchronizing signal records on the tape, such as encountered at a splice where wave forms are not matched. As was explained in detail in the introductory paragraphs of the specification, the echelon arrangement of heads introduces an averaging effect on the two signals across the splice, furnishing a continuoush usable output signal.

Figure 3:
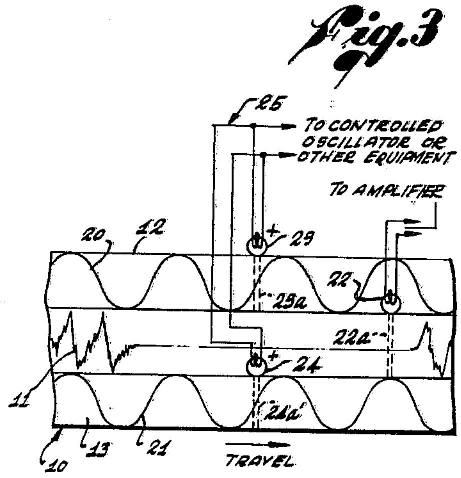
FIG. 3 shows a modification of FIG. 2.

It will be seen that the two synchronizing signals, recorded on the tape a full wave length distance apart in FIG. 1, may, with sacrifice of the averaging effect over splices, also be scanned by two reproducer heads located directly across the tape from one another. Since the synchronizing signals are displaced along the tape by exactly a wave length (or any multiple thereof), the two directly opposed reproducer head slits will in such case reproduce from points on the two synchronizing signal records which are of like phase, but recorded at time intervals equal to the period of the wave, or multiple thereof. FIG. 3 illustrates such a reproducing system, differing from FIG. 2 only in that the reproducer head 24′ is located directly opposite reproducer head 23, it being understood that the reproducer system of FIG. 3 utilizes a record made as in the recording system of FIG. 1. FIG. 3 demonstrates that a record made with echelon recorder heads may, if necessary in any given case, be reproduced by transversely aligned heads connected in phase.

In addition, there is an important advantage in the event the synchronizing or timing signal should be interrupted. Supposing the recording and reproducing system constituted of FIGS. 1 and 3 to represent a telemetering system, rather than a sound picture system, with the timing or synchronizing signal transmitted over a long distance either by wired circuit or radio, there may occasionally be momentary breaks, interruptions, interferences or distortions in the timing or synchronizing signal, with corresponding defects or blanks in the records on the two tracks 12 and 13. However, those defects or blanks appear on the tracks 12 and 13 the echelon displacement distance apart, and if the defect or blank does not persist for as great a distance along the tape as the echelon displacement distance of the recorder heads, at least one of the transversely aligned reproducer heads will at all times be scanning its corresponding recording of the signal either ahead of or after the break or other defect. In other words, defects or blanks in the two records coinciding in time of recording, but spaced apart along the records by the echelon displacement distance, will pass the transversely aligned reproducer heads at different times, spaced one, or a plurality of wave periods apart. Thus continuous reproduction of a synchronizing signal is attained, notwithstanding breaks or other defects in the signal recorded. Of course, for this purpose, it is desirable in practice that the recorder heads be fairly substantially spaced apart, and a substantial number of whole wave length distances is appropriate.

Figure 4:
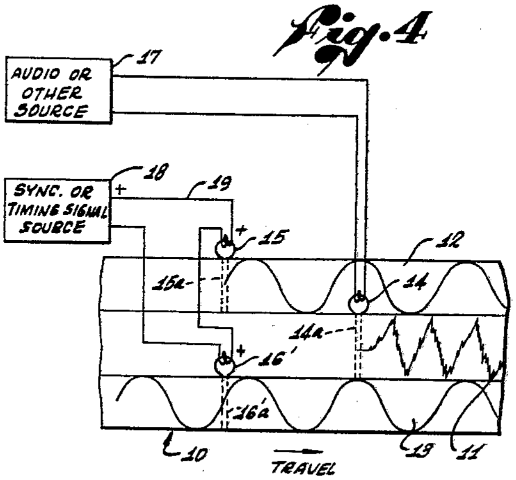
FIG. 4 shows a modification of FIG. 1.

Also, in recording, in certain cases, the recorder heads may be directly opposite one another, as in FIG. 4, and the reproducer may then be as in FIG. 2, spaced by one or more wave lengths along the tape. In FIG. 4, arrangements are exactly as in FIG. 1, with similar reference numerals designating corresponding parts, with the exception that the recorder head 16′ is located directly opposite recorder head 15. The recorder heads 15 and 16′ are energized in phase, and the recorded synchronizing signal wave form components 20′ and 21′ appear as in FIG. 1, the only difference being that they are recorded directly opposite one another, rather than with wave length spacing along the tape. As stated, the record made as in FIG. 4 may be reproduced in the reproducer of FIG. 2, the only difference in reproduction being that the two synchronizing signal wave components are reproduced from portions of the recorded waves which were recorded a period or more apart in time sequence. Here, the benefit of averaging synchronizing signals across a splice is preserved.

Consider now the recording and reproducing system represented by FIGS. 4 and 2, taken in combination, to represent a telemetering system rather than a sound-picture system, and the source 18 to represent a telemetering timing signal source. Such timing signal may have breaks, interruptions, interferences or distortions, resulting in defects or blanks in the timing signal records on tracks 12 and 13. By recording two records of the timing signals in heads directly across from one another, as in FIG. 4, and scanning these records with reproducer heads in echelon (spaced one or more wave lengths apart) as in FIG. 2, coinciding defects or blanks in the two records will pass the echelon reproducer heads at different times, spaced apart in time by one or more wave periods. Thus, unless the duration of the timing signal defect or blank is greater than the time differential by which a given point on the tape passes the two reproducer heads, a continuous, unbroken timing signal will be delivered to the reproducer output circuit 25.

From a consideration of the assumed telemetering systems made up in one case of FIG. 1 together with FIG. 3, and in the other of FIG. 4 together with FIG. 2, it will be seen that the advantage of the ability to reproduce an unbroken synchronizing signal, notwithstanding breaks in the received signal, depends broadly upon utilizing a spacing between recorder and reproducer heads along one track which differs by one or multiple of wave length distances from the spacing between recorder and reproducer heads along the other track. This evidently requires echelon spacing of heads in either the recorder or reproducer; and a little consideration will show that echelon spacing may also be used in both recorder and reproducer, provided the spacing of recorder and reproducer heads along one track differs from the spacing of recorder and reproducer heads along the other track by one wave length, or a multiple thereof. The system of FIGS. 1 and 2 can also clearly be modified by increasing the echelon displacement distance in either recorder or reproducer by any number of full wave length distances. In this general connection, another problem, that of a "pip," or irregularity, in the synchronizing or timing signal recorded on the two tracks, is effectively dealt with by the system under discussion, in that such "pip" or irregularity is not simultaneously reproduced by the reproducer heads, and its amplitude in the final combined signal from the reproducer heads thereby reduced by one half. Thus, the irregularity appears twice in the final output, but at half amplitude, which can be of great advantage over one irregularity occurrence at full amplitude.

Reference is next directed to FIG. 5, showing a reproducer cooperable with the recorder of FIG. 1 in a combined recorder-reproducer. In FIG. 5, the synchronizing signal reproducer heads are in echelon on the two synchronizing signal tracks, displaced from one another longitudinally of the tape by a wave length distance (or, in practice, any multiple thereof). In addition, plural reproducer heads are provided for each synchronizing signal track, these being, in each case, spread apart a wave length distance, or any multiple thereof.

In FIG. 5, members corresponding with members in FIG. 2 are, for convenience, identified by the same reference numerals, and a description of the common parts of the systems need not be repeated. In FIG. 5, three reproducer heads 30*a*, 30*b* and 30*c* are arranged in tandem over synchronizing signal track 12 at wave length spacing apart. Similarly three reproducer heads 31*a*, 31*b* and 31*c* are arranged in tandem over track 13. The groups of three, as shown, are merely illustrative; there may be two, three, or more heads in each tandem series. The two tandem series of heads are spaced apart longitudinally of the tape, typically and preferably by a wave length distance, as shown, or any multiple thereof. The heads in each tandem series are illustrated as one wave length apart, though in practice a spacing equal to a multiple of wave lengths would generally be used for reasons of adequate spacing.

The reproducer heads are connected together in phase, as indicated by the positive reference polarity markings; and they may be connected in parallel or series with one another, though they are here illustrated as connected in a series output circuit 34.

The plural head system of FIG. 5 is of increased advantage in assuring the reproduction of an improved and dependable synchronizing signal over a splice where the synchronizing signal records are not spliced in phase, or in the event of an irregularity or spurious "pip" in the recorded signal. This subject was discussed hereinabove in relation to the echelon system of FIGS. 1 and 2, and in detail in the introduction to the specification. It can readily be appreciated that the use of additional heads, spaced a full wave length distance apart, or multiple thereof, improves the reproduced output signal form by reason of the averaging effect of the added heads.

It will be seen that the reproducer system of FIG. 5 is also of advantage in the event of a momentary irregularity or spurious "pip" in the recorded signal, in that such a condition will be averaged down in the multiple head reproducer system.

It should be clear from the foregoing that an averaging effect across an out-of-phase splice, or in the event of a signal irregularity, is obtained in the combined total of reproduced signal components from the plural wave-length-spaced reproducer heads scanning each track. The invention, in this aspect, is applicable also to single synchronizing signal track systems. FIG. 5 is sufficiently illustrative of such a simplified form of the invention, it being merely noted that the invention may be practiced in this aspect with use of but one synchronizing track and the plural heads associated therewith, spaced one or more wave lengths apart.

Additional variations of the recorder-reproducer system of FIGS. 1 and 5, taken together, are at once evident. If the recorder heads over the two tracks are in echelon, the reproducer for the two track heads are preferably positioned in echelon by corresponding echelon displacement distances, as here shown, or may be spaced any number of full wave lengths from such positions. If the recorder heads are at full wave length echelon displacement distances, the wave-length-spaced reproducer heads over the two tracks can be at corresponding echelon displacement distances, or any multiple thereof, or can be transversely opposite one another.

It will further be seen that, while the system of FIG. 5 shows equal numbers of heads over each track, it is not necessary, broadly speaking, that equal numbers be employed. A plurality may be used over one track, and a single head over the other, giving some advantage, though plural heads over both tracks are most advantageous. Also, while the invention has been particularly disclosed herein in a form using two synchronizing or timing signal tracks, it will be clear that more than two tracks can be used, particularly in telemetering and related applications. The same is true for all disclosed forms of the invention. In the application to telemetering, saw-tooth signal waves used in a multiple-track, multiple-head arrangement afford a precision of timing that will be more accurate and dependable than is obtainable from any single-track, single-head synchronizing system.

FIGS. 6 and 7 show a recorder and reproducer system exactly like that of FIGS. 1 and 2, respectively, with the single exception that the echelon displacement distance has been adjusted to half wave spacing. System components corresponding exactly to those of FIGS. 1 and 2 are identified by like reference numerals, and a description thereof will not be repeated. It is noted, however, that the synchronizing signal recorder heads 15 and 16 are again energized in phase. The synchronizing signal wave forms 40 and 41 on the two tracks are accordingly displaced by a half wave length, as shown. The synchronizing signal reproducer heads are connected in phase, and being spaced apart a half wave length echelon distance, the signal voltages reproduced thereby are in phase, all as symbolized by the positive reference polarity markings. It will be seen that the half wave echelon system has certain advantages similar to the full wave echelon spacing system described earlier.

Plural reproducer heads may be used with half wave echelon spacing. FIG. 8 shows such an arrangement, and, in this figure, circuit elements corresponding to circuit elements of FIG. 5 are identified by the same reference numerals, but with the addition of primes. No further description should be necessary, it being clear that the advantage of multiple heads is simply added to the half wave spacing system, combining the advantages of these features.

In connection with the half wave echelon spacing systems (FIGS. 6–8), attention is directed to the fact that the two synchronizing signal wave forms, recorded in phase but displaced by a half wave length distance from one another, appear, when examined directly across from one another, as a push-pull recording. It is possible, accordingly, to reproduce in push-pull by using reproducing heads located directly opposite one another, as in FIG. 3, but interconnected properly for working into a push-pull amplifier. FIG. 9 shows such a reproducer, which may be understood as usable with the recorder of FIG. 6 in a combined recorder-reproducer system. The reproducer heads, indicated at 23' and 24' in this case, have simply been adjusted to positions of transverse alignment, and they are connected in a push-pull circuit 45, as indicated, which will be understood to work into a push-pull amplifier feeding the amplified synchronizing signal to the controlled oscillator. An advantage here is that a record made as in the recorder system of FIG. 6 may optionally be reproduced by a conventional reproducer of push-pull type. It will also be appreciated that the system of FIG. 9 may have additional heads over each track, spaced one or more wave lengths from the heads shown.

It is also within the invention to use a recorder, such as shown in FIG. 4, where the recorder heads 15 and 16' are in transverse alignment, and are energized in phase, and to reproduce the records made therein in push-pull, as in the system of FIG. 10, where the reproducer heads 23'' and 24'' are at half wave echelon spacing, but connected in push-pull in a circuit 45', similar to that of FIG. 9.

It will also be seen that the synchronizing signal records recorded on two tracks in phase, but with echelon spacing of a wave length, or multiple thereof, as, for example, in FIG. 1, can, if desired, be reproduced in push-pull by using an echelon spacing of reproducer heads of half wave length spacing, or one and one-half wave length spacing, etc., the heads being connected in push-pull.

The wave length echelon spacing distance of recorder heads and reproducer heads will be seen to be subject to considerable modification within the scope of the invention. For example, the recorder heads of FIG. 1 may be at one or more wave length spacings, while the reproducer heads may also be at one or more wave length spacings; and the number of wave length spacings need not be the same for the reproducer heads as for the recorder heads. The relation may be expressed by saying that the echelon spacing of the recorder heads is $n\lambda$, and the echelon spacing of the reproducer heads is $n'\lambda$, where $n$ and $n'$ are any integers, not including zero. To cover the case of half wave echelon systems, as in FIGS. 6 and 7, it may be said that the recorder heads are spaced by $n\lambda/2$, and the reproducer heads by $n'\lambda/2$. Again, while there is advantage in wave length echelon spacing, and in half wave length echelon spacing, the echelon spacing, broadly, may be entirely arbitrary. Moreover, if the recorder heads are in echelon spacing by a distance $d$, the reproducer heads may then be at a spacing distance equal to $d+n\lambda$, or at $d+n\lambda/2$, where $n$ is any algebraic whole number, i.e., positive or negative, and understood to include zero, and $\lambda$ is a full wave length distance. Still more generally, if the recorder heads are at a displacement distance of $d+n\lambda$, where $d$ is any arbitrary distance, other than $n\lambda$, and which may be zero, and $n$ is any algebraic integer, then the reproducer heads may be spaced at $d+n'\lambda$, where $n'$ is any algebraic integer. It is understood that the algebraic integers $n$ and $n'$ may be positive or negative numbers. In any case in which $d$ is zero, the recorder and reproducer heads are then at wave length echelon spacing, or multiples thereof. For the half wave case, the recorder heads are, of course, at $d+n\lambda/2$, and the producer heads at $d+n'\lambda/2$. The half wave case will be seen to be so defined as to include the full wave case.

The invention has now been disclosed in a number of illustrative forms and applications. It will be understood, of course, that these are for illustrative purposes only, and many variations beyond those specifically identified herein are within the scope of the broad invention as defined by the broader of the appended claims.

What is claimed is:

1. A magnetic reproducer for reproducing a substantially sinusoidal signal from a signal record extending along a traveling record medium in the direction of travel thereof, comprising: a plurality of reproducer heads associated with said record medium and spaced from one another in the direction of travel of the medium by any multiple, including unity, of a full wave length distance along the medium, and means connecting said reproducer heads in phase.

2. A magnetic recording and reproducing system for recording two records of a given substantially sinusoidal signal on a traveling magnetic record medium and reproducing said signal therefrom, comprising: recorder and reproducer heads associated with each of two different tracks of said record medium, the reproducer heads associated with at least one of said tracks comprising a plurality of tandem heads spaced along said medium in the direction of travel thereof by any multiple, including unity, of a full wave length distance along the medium, means energizing the recorder heads in phase from a common signal source, and means connecting the reproducer heads in phase.

References Cited in the file of this patent

UNITED STATES PATENTS

| | | |
|---|---|---|
| 2,628,346 | Burkhart | Feb. 10, 1953 |
| 2,709,204 | Holmes | May 24, 1955 |